United States Patent [19]

Fan et al.

[11] Patent Number: 5,123,026

[45] Date of Patent: Jun. 16, 1992

[54] FREQUENCY-DOUBLED, DIODE-PUMPED YTTERBIUM LASER

[75] Inventors: Tso Y. Fan, Cambridge; Philip Lacovara, Lowell, both of Mass.

[73] Assignee: Massachusetts Institute of Technology, Cambridge, Mass.

[21] Appl. No.: 608,564

[22] Filed: Nov. 2, 1990

[51] Int. Cl.⁵ ............................................. H01S 3/091
[52] U.S. Cl. ..................................... 372/75; 372/20; 372/21; 372/22; 372/36
[58] Field of Search ................. 372/36, 75, 21, 22, 372/20, 41

[56] References Cited

U.S. PATENT DOCUMENTS

| | | | |
|---|---|---|---|
| 3,868,589 | 2/1975 | Wang | 372/20 |
| 3,934,210 | 1/1976 | Yarborough et al. | 372/20 |
| 4,791,631 | 12/1988 | Baumert et al. | 372/75 |
| 4,809,291 | 2/1989 | Byer et al. | 372/75 |
| 4,847,851 | 7/1989 | Dixon | 372/75 |
| 4,884,277 | 11/1989 | Anthon et al. | 372/75 |

OTHER PUBLICATIONS

Kaminskii, Alexander, *Laser Crystals*, Springer-Verlag, N.Y. 1981, pp. 105 and 108.

Weber, Marvin (ed.), *CRC Handbook of Laser Science and Technology*, vol. I, CRC Press, FL., 1982, p. 201.

Krupke et al., "Ground-state depleted solid-state lasers: principles, characteristics and scaling", Optical and Quantum Electronics 22 (1990), pp. S1-S22, received Sep. 14, 1989 and accepted Nov. 7, 1989.

Fan et al., "Diode Laser-Pumped Solid-State Lasers", IEEE Journal of Quantum Electronics, vol. 24, No. 6, Jun. 1988, pp. 895-912, received Dec. 16, 1987 and revised Feb. 1, 1988.

Fan et al., "Modeling and CW Operation of a Quasi-Three-Level 946 nm Nd: YAG Laser", IEEE Journal of Quantum Electronics, vol. QE-23, No. 5, May 1987, pp. 605-612.

Etzel et al., "Stimulated Emission of Infrared Radiation from Ytterbium Activated Silicate Glass", Applied Optics, Optical Pumping and Masers, vol. 1, No. 4, Jul. 1962, pp. 534-536.

Reinberg et al., "GaAs: Si LED Pumped Yb-Doped YAG Laser", Applied Physics Letters, vol. 19, No. 1, Jul. 1, 1971, pp. 11-13.

Johnson et al., "Coherent Oscillations from $Tm^{3+}$, $Ho^{3+}$, $Yb^{3+}$ and $Er^{3+}$ Ions in Yttrium Aluminum Garnet", Applied Physics Letters, vol. 7, No. 5, Sep. 1, 1965, pp. 127-129.

Robinson et al., "Stimulated Emission from $Nd^{3+}$ and $Yb^{3+}$ in Noncubic Sites of Neodymium- and Ytterbium-Doped $CaF_2$", Journal of Applied Physics, vol. 38, No. 11, Oct. 1967, pp. 4495-4501.

Zayhowski et al., "Single-Frequency Microchip Nd Lasers", Optics Letters, vol. 14, No. 1, Jan. 1, 1989, pp. 24-26.

Hanna et al., "Continuous-Wave Oscillation of a Monomode Ytterbium-Doped Fibre Laser", Electronics Letters, vol. 24, No. 17, Aug. 18, 1988, pp. 1111-1113.

Fan et al., "Scalable, end-pumped, diode-laser-pumped laser", Optics Letters, vol. 14, No. 19, Oct. 1, 1989, Received Jun. 5, 1989; accepted Jul. 7, 1989, pp. 1057-1059.

Kintz et al., "Single-Frequency Operation in Solid-State Laser Materials with Short Absorption Depths", IEEE Journal of Quantum Electronics, vol. 26, No. 9, Sep. 1990, pp. 1457-1459.

*Primary Examiner*—Georgia Y. Epps
*Attorney, Agent, or Firm*—Fish & Richardson

[57] ABSTRACT

A ytterbium-doped solid state laser including a resonant cavity formed by an input mirror and an output mirror; and a gain medium within the resonant cavity, the gain medium being made of a ytterbium-doped host material having a ytterbium ion doping level and a thickness sufficient to yield single longitudinal mode laser operation when the resonant cavity is pumped by an external light source.

22 Claims, 2 Drawing Sheets

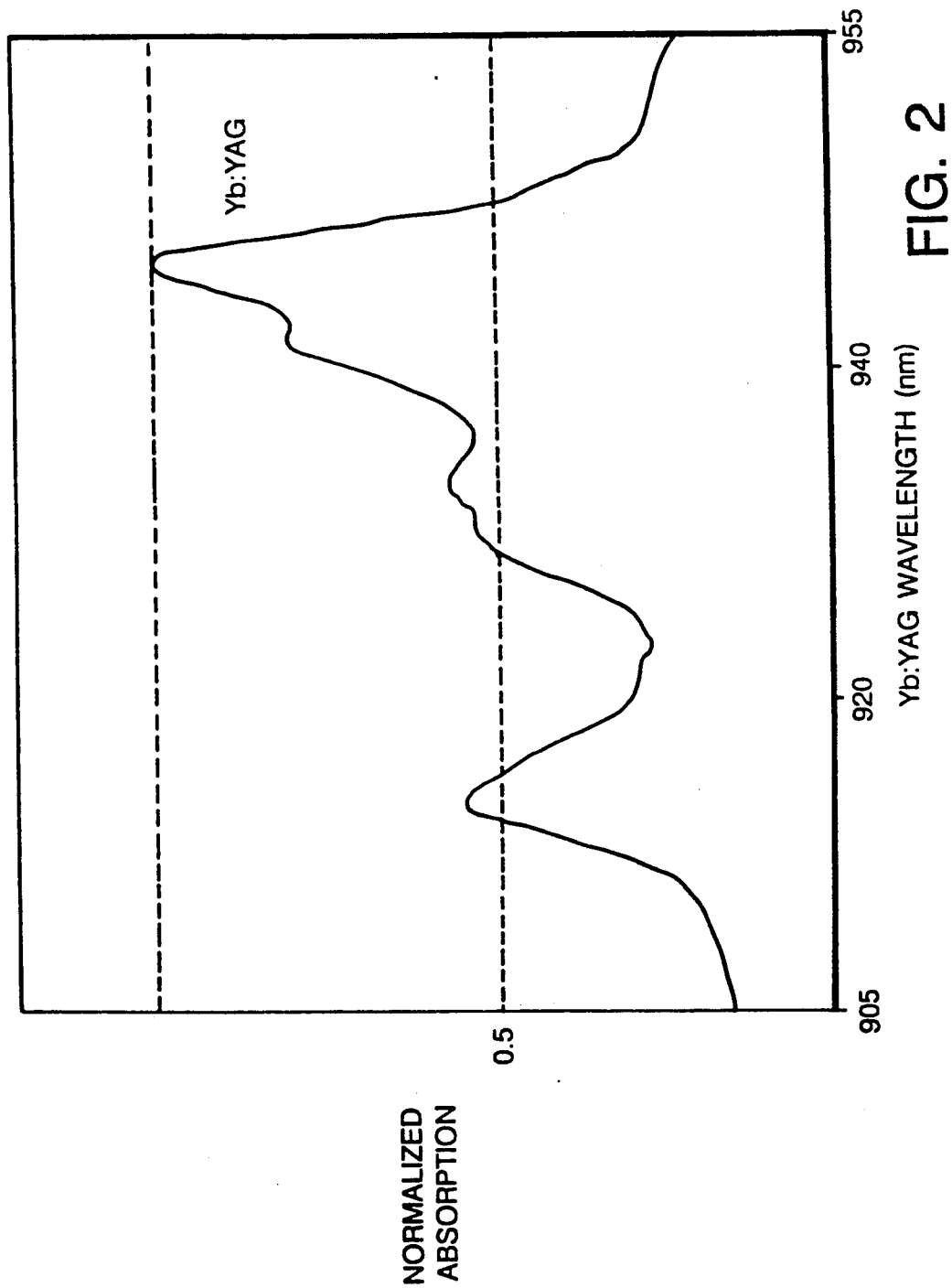

FREQUENCY-DOUBLED, DIODE-PUMPED YTTERBIUM LASER

The Government has rights in this invention pursuant to contract no. F 19628-90-C-0002 awarded by the Department of the Air Force.

BACKGROUND OF THE INVENTION

The invention relates to rare-earth-doped solid state lasers.

Laser operation generally involves three basic transition processes, namely, absorption, spontaneous emission and stimulated emission. Each of these processes can be easily understood with the aid of a simple two energy level system in which the low energy level or ground state is designated by $E_1$ and the higher energy level or excited state is designated by $E_2$. In this simplified system, atoms can be in either one of these two states and at room temperature most of the atoms are generally in the ground state. An atom can change state by either absorbing or emitting a photon of energy $h\nu_{12} = E_2 - E_1$, where h is the Planck constant and $\nu_{12}$ is the frequency of the photon.

Shining a light of frequency $\nu_{12}$ on the system typically results in some atoms absorbing a photon of energy $h\nu_{12}$ and jumping to the excited state. This process is called absorption. An atom in the excited state, however, is unstable and will remain in that state for only a short time after which it falls back to the ground state and emits a photon of energy $h\nu_{12}$. This process is called spontaneous emission. It is also possible for a photon to fall on an atom in an excited state, causing the atom to fall to the ground state and emit a photon having the same phase as the impinging photon. This process is referred to as stimulated emission. Under proper conditions, stimulated emission can produce an intense, monochromatic beam of coherent light.

Because of the requirements of various applications, coherent light at certain wavelengths is especially desired. Thus, investigators have expended a significant amount of effort developing lasers which produce light at those wavelengths. Green laser light is an example of one color which has many uses and for which there is a substantial need. Currently, AR+ lasers are most commonly used to provide the particular wavelength of green that is wanted.

SUMMARY OF THE INVENTION

In general, in one aspect, the invention is a ytterbium-doped solid state laser including a resonant cavity formed by an input mirror and an output mirror; and a gain medium within the resonant cavity. The gain medium is made of a ytterbium-doped host material having a ytterbium ion doping level and a thickness sufficient to yield single longitudinal mode laser operation when the resonant cavity is pumped by an external light source.

Preferred embodiments include the following features. The material is a garnet selected from a group consisting of yttrium aluminum garnet, yttrium scandium aluminum garnet, gadolinium scandium aluminum garnet, lutetium aluminum garnet and ytterbium aluminum garnet. The first mirror is formed on a surface of the gain medium. The ytterbium-doped solid state laser also includes a frequency doubler that doubles the frequency of the light emitted from the gain medium during laser operation. The frequency doubler is located within the resonant cavity and is a crystal made of a material selected from the group consisting of potassium titanyl phosphate, yttrium aluminum borate, lithium borate, potassium niobate and lithium niobate. The gain element is located at one end of said resonant cavity and has a ytterbium doping level greater than about $2 \times 10^{21}$ cm$^{-3}$ and a thickness less than about 1 millimeter. The invention also includes a pump laser for pumping the resonant cavity and a heat sink in thermal contact with the gain medium. The pump laser is an InGaAs strained-layer diode laser array and the heat sink is transparent at the wavelength of the external light source. In addition, the invention includes a wavelength discrimination element located within the resonant cavity When the ytterbium-doped host material is a ytterbium-doped garnet, the wavelength discrimination element allows laser oscillation near 1030 nm while suppressing laser oscillation near 1048 nm.

One advantage of the invention is that it efficiently generates an output beam at about 515 nanometers thereby making it a good replacement for the inefficient, more expensive argon ion lasers that are typically used to generate such wavelengths. The invention also exhibits electrical to optical conversion efficiencies that are many times higher than the AR+ laser, which is intrinsically limited to about 0.05%. Yet other advantages of the invention are that it yields single longitudinal mode operation, it has reduced power requirements in comparison to AR+ lasers and it can be easily cooled without the need for complex cooling equipment.

Other advantages and features will become apparent from the following description of the preferred embodiment and from the claims.

DESCRIPTION OF THE PREFERRED EMBODIMENT

FIG. 2 is an absorption spectrum for Yb:YAG;

STRUCTURE AND OPERATION

Figure 1:
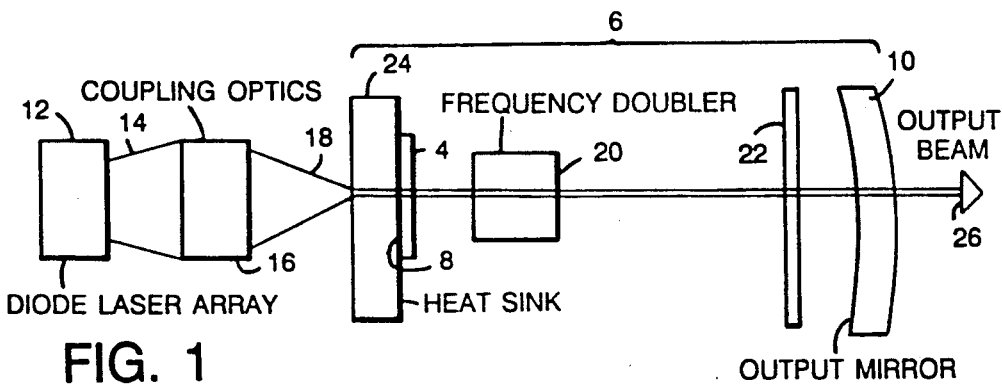
FIG. 1 depicts a frequency-doubled, diode-pumped ytterbium laser system.

Referring to FIG. 1, a frequency-doubled, diode-pumped ytterbium-doped yttrium aluminum garnet laser 2 (referred to hereinafter as Yb:YAG laser 2) includes a thin Yb:YAG gain medium 4 located at one end of a resonant cavity 6 formed by an input mirror 8 and a output mirror 10. A diode laser array 12 generates output beams 14 each having a wavelength lying in the ytterbium absorption range which typically is around 940 nanometers. An optical coupler 16 combines the output beams to form a pump beam 18 that is directed into resonant cavity 6 through input mirror 8. Pump beam 18 stimulates fundamental mode (i.e., TEM$_{00}$) laser emission in Yb:YAG gain medium 4 at a wavelength of between 1023 and 1035 nanometers. Within resonant cavity 6, a type II frequency doubling crystal 20 and a quarter wavelength plate 22 achieves efficient intracavity frequency doubling (or second harmonic generation—SHG) of the fundamental mode to produce a second harmonic wave at about 515 nanometers. Quarter wave plate 22 is oriented within resonant cavity 6 so that its allowed polarization axes are at 45° to the allowed polarization axes of doubling crystal 20. Of course, a type I, rather than a type II, frequency doubling crystal may also be used, in which case, quarter wave plate 22 is not required and polarization of the laser is controlled by laser alignment.

In the described embodiment, diode laser array 12 is made up of InGaAs strained-layer diode lasers which typically generate an output beam at the ytterbium absorption wavelengths. Also, Yb:YAG gain medium 4 is mounted on a heat sink 24 that is transparent to the wavelength of pump beam 18. Input mirror 8 is a reflective layer formed on the surface of Yb:YAG gain medium 4 which is proximate to heat sink 24 and which has high reflectivity at both the fundamental and second harmonic wavelengths of laser 2. The reflective layer is formed on a polished surface of gain medium 4 using fabrication techniques known to those skilled in the art. Output mirror 10 also has high reflectivity at the fundamental wavelength, but in contrast to input mirror 8, it has high transmission at the second harmonic wavelength. Thus, mirrors 8 and 10 contain the power of the fundamental within resonant cavity 6 while output mirror 10 allows the power of the second harmonic to exit as an output beam 26.

Both the doping of the Yb:YAG gain medium and its thickness are selected so as to yield single longitudinal mode continuous-wave (CW) operation for Yb:YAG laser 2. To achieve single mode operation, it is generally desirable that the presence of ytterbium ions in the host garnet be greater than about $2 \times 10^{21}$ cm$^{-3}$ and t hat the thickness of gain medium 4 in the longitudinal direction (i.e., the direction of stimulated laser emission) be less than about 1 millimeter.

In general, single mode operation is not achieved in standing wave cavities because of spatial hole burning. The intracavity power of a mode inside the cavity forms a standing wave. At the nulls of the standing wave of a single mode, the gain of the laser is not depleted by the mode, thus sufficiently far above threshold, additional modes have enough gain to oscillate. In highly doped Yb laser materials, there is fast migration of the excitation. In other words, one excited Yb ion can transfer its energy to an adjacent Yb ion on time scales that are fast compared to the upper state lifetime. This migration of excitation smooths the spatial hole burning effects thus allowing higher power in a single mode before additional modes oscillate. As the Yb concentration increases, these migration effects become more effective.

Decreasing the thickness of the gain medium encourages single mode operation through a different principle. If a thin gain medium is placed at the end of the laser cavity where the nulls and peaks of the standing wave patterns for the various modes are in phase, the unused gain at the nulls cannot be accessed by any of the other modes. Making the gain medium thinner reduces the dephasing which occurs among the standing waves over the length of the gain medium, thereby allowing higher single mode power. Note that dephasing occurs because of the slightly different wavelengths of the various modes. Both high Yb doping and placing the gain medium adjacent to an end mirror raise the amount of single mode power attainable. Multimode operation may occur, however, if the laser is operated sufficiently far above threshold.

Of course, the thickness of gain medium 4 must also be large enough so that a substantial portion of the pump light is absorbed and the minimum thickness required for such operation varies inversely with the doping level of the gain medium. For doping levels on the order of about $1.4 \times 10^{22}$ cm$^{-3}$ (i.e, where the host becomes a stoichiometric ytterbium material in which yttrium is completely replaced by ytterbium in the host crystal), then thicknesses of less than 100 microns are possible. Moreover, multiple pass pumping may permit the laser crystal to be even thinner.

Note that single longitudinal mode operation is defined herein as operation in which more than 75% of the power is in a single longitudinal mode. It is often desirable, however, to have an even greater percentage of the total power within the single mode (e.g. at least 99%). Such operation can be achieved by using a ytterbium doping level sufficiently high so that a gain medium of the appropriate thinness can be used.

The trivalent ytterbium ion has only one excited $4f$ level located at about 10,000 wavenumbers, the next higher level being in the $5d$ configuration which is much higher in energy. The crystal field only splits these $4f$ levels by about 700 wavenumbers, with the result that a ytterbium laser is quasi 3-level at room temperature. Thus, there is a finite electron population in the lower laser level with the attendant high threshold. The absence of accessible excited states in the spectrum of Yb-doped crystal eliminates the problems of excited absorption and upconversion and also the reduction in quantum efficiency caused by cross-relaxation. The absence of upconversion and cross-relaxation allows crystals to be doped to high, even stoichiometric levels of ytterbium, without concentration quenching seriously limiting the performance of the crystal. (Note that the ytterbium ion is similar in size to that of yttrium, so that it usually may be fully substituted for the latter.) The high doping levels also allow acceptable pump absorption and laser gain from elements in the form of thin platelets, which, in turn, can be cooled more easily than thicker elements.

As illustrated by FIG. 2 by an absorption spectrum for Yb:YAG, the Yb:garnets typically have a broad absorption band around 940 nanometers. Thus, they commonly exhibit reduced sensitivity to variations in both the static and the temperature-tuned wavelengths of the pump laser diodes. Consequently, in many applications air cooling of the pump source by convection will be adequate and the need for elaborate temperature control mechanisms will be avoided.

Ytterbium-doped garnets are also characterized by a single strong emission line of moderate width. Thus, the stimulated emission (laser gain) cross-section is fairly large. The stimulated emission transition terminates at the second highest stark level in the ground manifold, so that Yb:garnet lasers have moderate thresholds at room temperature. Improved performance can be achieved by cooling the Yb crystal below room temperature to lower the threshold. Even moderate cooling, e.g., to 250 K, should lower the threshold by about 50%.

There are many well developed frequency doubling crystals for the wavelength range at which the Yb:YAG lases. Some possibilities include potassium titanyl phosphate (KTP), yttrium aluminum borate (YAB), lithium borate (LiB$_3$O$_5$), potassium niobate (KNbO$_3$) and lithium niobate (LiNbO$_3$). Such materials may be used either inside the resonant cavity to generate intracavity doubling (as shown in FIG. 1) or outside of the resonant cavity alone or within a separate cavity which resonates the fundamental mode. Intracavity doubling, where the doubling crystal can take advantage of the high intensities achieved within the resonant laser cavity, however tends to yield higher doubling efficiencies.

Ytterbium-doped garnets are well suited for intracavity doubling. Ytterbium-doped materials are clear throughout the visible region, so that the second harmonic generated by that part of the fundamental which is propagating "backwards" in the cavity will not be lost by absorption in the laser crystal and thus it can be coupled out.

One difficulty with intracavity doubling of Yb-doped garnet lasers is that the line with the lowest threshold may not be the 1.03 μm line, but instead the lower gain line at ~1.048 μm which has its lower level at the top of the ground state manifold. This problem will occur in sufficiently low loss laser cavities because less population needs to be inverted for the 1.048 μm line to oscillate. This can be prevented by addition of optical elements to force oscillation on the 1.03 μm line. Some possible ways to provide sufficient discrimination are by inserting etalons, a birefringement tuning plate, or materials with higher loss at 1.048 than 1.03 μm. Other possibilities are to use a Littrow prism, coatings which have lower cavity loss for 1.03 than for 1.048 μm, or an external grating to feedback the 1.03 μm wavelength. In the general case, the discrimination elements are used to suppress the lowest threshold line in a low loss cavity in favor of a higher gain or more desirable wavelength line.

Other garnet hosts for the ytterbium ion besides YAG may also permit laser operation at wavelengths close to 1030 nanometers. Examples of alternative garnet hosts include yttrium scandium aluminum garnet, gadolinium scandium aluminum garnet, lutetium aluminum garnet, lutetium scandium aluminum garnet, and ytterbium aluminum garnet. Spectroscopic measurements indicate that these Yb-doped garnets are well suited for InGaAs diode laser pumping. Other hosts for the ytterbium ion besides garnets include yttrium lithium fluoride and yttrium aluminum perovskite, although their output wavelengths may be further from 1030 nanometers.

Figure 3:
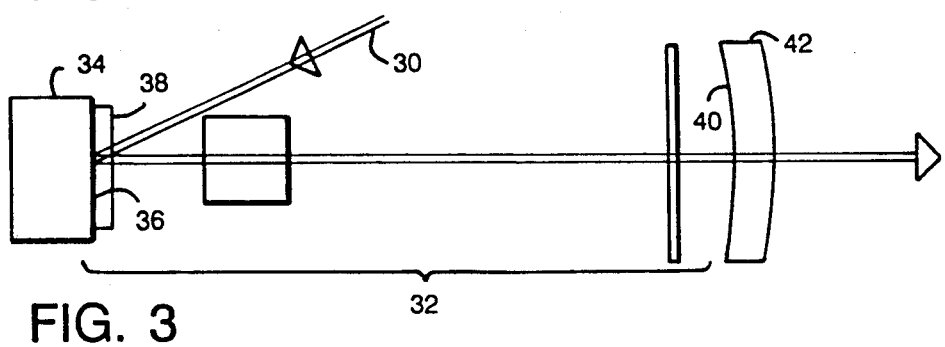
FIG. 3 depicts an alternative embodiment employing a heat sink which is not transparent at the pump beam wavelength.

Other embodiments are within the following claims. For example, a heat sink may be used that is opaque to the wavelength of the pump beam. In that case, referring to FIG. 3, the pump beam 30 is introduced through the side of resonant cavity 32 rather than through heat sink 34. A reflective surface 36 on the backside of gain medium 38 and a reflective surface 40 on an output mirror 42 form the laser resonator.

Figure 4:
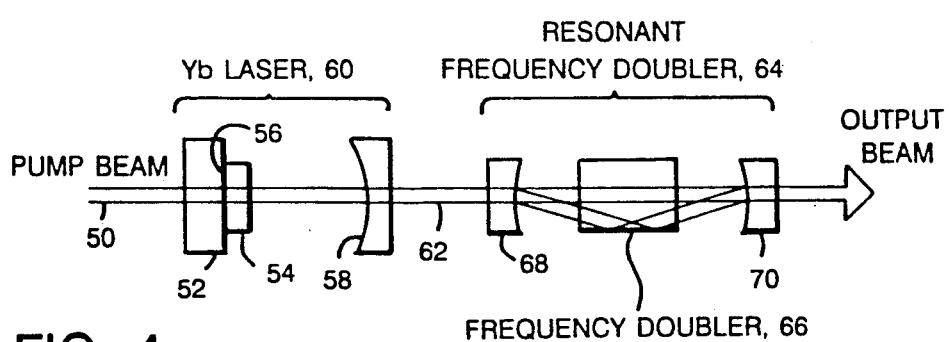
FIGS. 4 and 5 depict alternative embodiments of a frequency doubled laser system.

In another embodiment, the frequency doubling crystal is located in a separate resonant cavity as shown in FIG. 4. In that case, the pump beam 50 passes through the heat sink 52 and into the Yb doped gain medium 54. The Yb laser 60 is formed by an input mirror 56 having high reflectivity at the Yb laser wavelength and an output mirror 58. The Yb laser's output beam 62 is then incident on a resonant frequency doubler 64 formed by two cavity mirrors 68 and 70 with a frequency doubling crystal 66.

Figure 5:
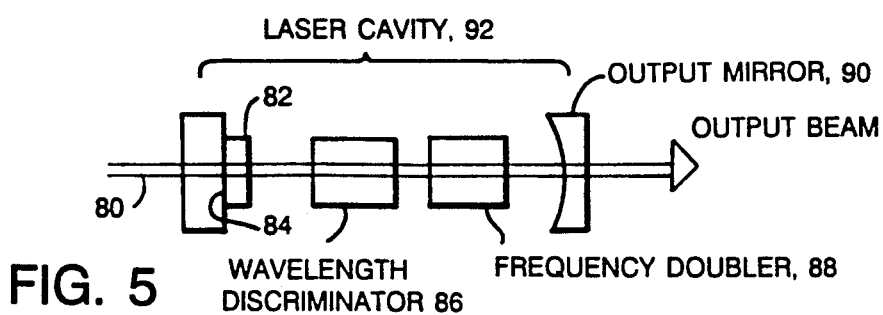

In yet another embodiment, a wavelength discrimination element may be placed inside an intracavity frequency doubled laser cavity to force laser operation at a particular wavelength as shown in FIG. 5. The pump beam 80 excites a Yb doped crystal 82 within a laser cavity 92 formed by a high reflector input mirror 84 and an output mirror 90. Laser cavity 92 also contains an intracavity frequency doubler 88 and a wavelength discriminator 86 which may be a birefringent tuning plate, a prism, or a dichroic absorber. Alternatively, the cavity mirrors 84 and 90 can be dichroic, that is, they have high reflectivity at the wavelength of interest and lower reflectively at the undesired wavelength.

What is claimed is:

1. A ytterbium-doped solid state laser comprising:
   a resonant cavity formed by an input mirror and an output mirror; and
   a gain medium within said resonant cavity, said gain medium made of a ytterbium-doped host material having a ytterbium ion doping level and a thickness sufficient to yield single longitudinal mode laser operation when said resonant cavity is pumped by an external light source.

2. The ytterbium-doped solid state laser of claim 1 wherein said host material is a garnet.

3. The ytterbium-doped solid state laser of claim 2 wherein said garnet is selected from a group consisting of yttrium aluminum garnet, yttrium scandium aluminum garnet, gadolinium scandium aluminum garnet, lutetium aluminum garnet and ytterbium aluminum garnet.

4. The ytterbium-doped solid state laser of claim 3 wherein said garnet is yttrium aluminum garnet.

5. The ytterbium-doped solid state laser of claim 1 wherein said first mirror is formed on a surface of said gain medium.

6. The ytterbium-doped solid state laser of claim 1 further comprising a frequency doubler that doubles the frequency of the light emitted from the gain medium during laser operation.

7. The ytterbium-doped solid state laser of claim 6 wherein said frequency doubler is located within said resonant cavity.

8. The ytterbium-doped solid state laser of claim 6 wherein said frequency doubler comprises a crystal made of a material selected from the group consisting of potassium titanyl phosphate, yttrium aluminum borate, lithium borate, potassium niobate and lithium niobate.

9. The ytterbium-doped solid state laser of claim 1 wherein said gain element is located at one end of said resonant cavity.

10. The ytterbium-doped solid state laser of claim 1 wherein the ytterbium doping level is greater than about $2 \times 10^{21}$ cm$^{-3}$.

11. The ytterbium-doped solid state laser of claim 1 wherein said thickness is less than about 1 millimeter.

12. The ytterbium-doped solid state laser of claim 1 further comprising a pump laser for pumping said resonant cavity.

13. The ytterbium-doped solid state laser of claim 12 wherein said pump laser comprises an InGaAs strained-layer diode laser.

14. The ytterbium-doped solid state laser of claim 12 wherein said pump laser comprises a diode laser array.

15. The ytterbium-doped solid state laser of claim 1 further comprising a heat sink in thermal contact with said gain medium.

16. The ytterbium-doped solid state laser of claim 15 wherein said heat sink is transparent at the wavelength of the external light source.

17. The ytterbium-doped solid state laser of claim 7 further comprising a wavelength discrimination element.

18. The ytterbium-doped solid state laser of claim 17 wherein said wavelength discrimination element is located within said resonant cavity.

19. The ytterbium-doped solid state laser of claim 18 wherein said wavelength discrimination element comprises a birefringent tuning plate.

20. The ytterbium-doped solid state laser of claim 19 wherein said ytterbium-doped host material is a ytterbium-doped garnet and said wavelength discrimination element allows laser oscillation near 1030 nm while suppressing laser oscillation near 1048 nm.

21. The ytterbium-doped solid state laser of claim 1 wherein the ytterbium ion doping level and the thickness of said gain medium are sufficient to yield single longitudinal mode laser operation at a temperature greater than or equal to about 250 K.

22. The ytterbium-doped solid state laser of claim 21 wherein the ytterbium ion doping level and the thickness of said gain medium are sufficient to yield single longitudinal mode laser operation at a temperature approximately equal to room temperature.

* * * * *